Nov. 3, 1953 L. W. ROWE ET AL 2,657,976
PROCESS FOR PRODUCING IRON OXIDE AND TITANIUM
TETRACHLORIDE FROM TITANIFEROUS IRON ORES
Filed Oct. 19, 1949
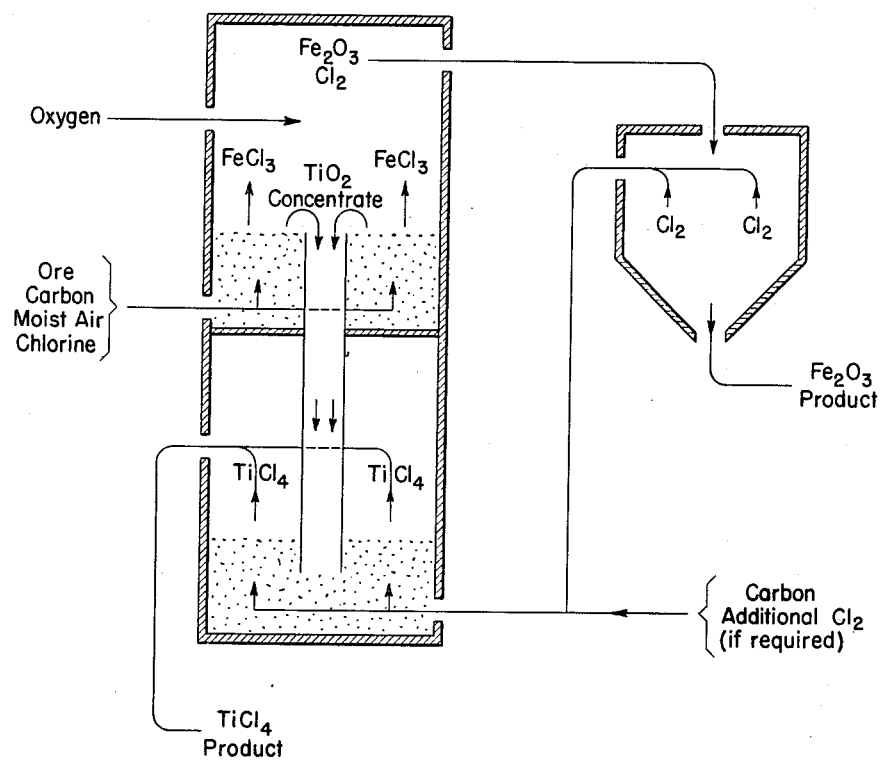
INVENTOR
Lancelot W. Rowe
Rollin P. Smith
BY
Charles F. Kaegebeh
ATTORNEY

Patented Nov. 3, 1953

2,657,976

UNITED STATES PATENT OFFICE 2,657,976

PROCESS FOR PRODUCING IRON OXIDE AND TITANIUM TETRACHLORIDE FROM TITANIFEROUS IRON ORES

Lancelot W. Rowe, Metuchen, and Rollin P. Smith, Westfield, N. J., assignors to National Lead Company, New York, N. Y., a corporation of New Jersey Application October 19, 1949, Serial No. 122,336

3 Claims. (Cl. 23—87)

This invention relates to a process for treating titaniferous iron ores or concentrates to produce titanium chloride and iron oxide therefrom. More particularly it relates to a chlorination process for recovering the iron and titanium values from said ore.

Many types of chlorination processes have been proposed for recovery of the metal values from various types of ores. Many of these processes employ various types of furnaces, such as shaft and rotary furnaces while others employ ceramic kilns. Many of the known processes require the ore and carbon to be pelletized or briquetted before chlorination which adds considerably to the time and expense of the operation.

An object of the present invention is to present a process for the manufacture of titanium chloride and iron oxide from titaniferous iron ores or concentrates. Another object is to provide a process for manufacturing titanium tetrachloride from titanium ores or concentrates more efficiently, conveniently, and at less cost than the heretofore proposed processes. A further object is to provide a unitary integrated process for producing titanium chloride and iron oxide from a titaniferous iron-containing raw material. A still further object is to provide a process for the treatment of iron-titaniferous raw material to produce titanium tetrachloride and iron oxide with a minimum of handling of intermediate products and efficient utilization of reagents required.

The present invention in its broadest aspects contemplates a unitary process in which titaniferous iron ores or concentrate is treated with chlorine to form as an intermediate product, iron chloride, which is converted to iron oxide and chlorine, and the released chlorine values are employed for chlorination of the titanium portion of the charge.

More specifically the unitary and integrated process comprises treating the ore with sufficient chlorine to selectively chlorinate the iron portion only. The iron chloride formed may be considered to be a transitory intermediate product which is oxidized to form iron oxide and chlorine, and the released chlorine is returned to the main reaction for chlorination of the titanium content in the ore. In its preferred embodiment, the process employs a mixture of ore containing iron and titanium and carbon in subdivided form which is treated in a fluidized state with chlorine and air at elevated temperatures. The volatile ferric chloride produced is substantially free from titanium compounds and is oxidized in the vapor phase to produce iron oxide particles and chlorine gas. The chlorine gas, with additional carbon and if necessary, chlorine, is returned to chlorinate in a fluidized state the titanium values contained in the remaining raw material.

A schematic diagram illustrating the general principles of the process of this invention is shown in the figure of the drawing. As shown the subdivided raw material is treated with chlorine and air preferably in a fluidized state. The term fluidized state when referred to in this specification comprises maintaining a bed of subdivided material in suspension, the suspension being maintained preferably by a regulated upward flow of gases therethrough. The individual particles are dynamic in the suspended bed and therefore the inherent disadvantages of a static bed, such as channeling and sintering, are avoided.

The chlorination of the iron values in the titaniferous iron material is accomplished by contacting a mixture of subdivided raw material and carbon with chlorine and air at an elevated temperature. A convenient method for carrying out this reaction is to suspend the ore and carbon to form a fluidized bed by the upward flow of gases therethrough. The amount of carbon used should be sufficient to aid in the chlorination of the iron values, and satisfactory results have been obtained when sufficient carbon is added to form $CO_2$ with the oxygen values released from the iron oxide during the chlorination of the iron values and to form $CO_2$ with the air added to suspend the bed, plus a slight excess, e. g. about 20% excess. The amount of chlorine necessary for an efficient and economical operation is substantially the amount required to react with the iron values but not the titanium values in the raw material. It will be found that the stoichiometric amount of chlorine added will be effective to chlorinate less than the entire iron content of the ore; generally efficiencies of about 90% may be expected. Normally when chlorine is added in excess of this preferred amount, the volatile iron chloride is contaminated with titanium chloride and a poor separation of the iron and titanium values is obtained. The temperature for the chlorination of the iron values is preferably carried out from 800° C. to 900° C.

When it is desired to maintain the suspension by the upward flow of gases through the suspension, the amount of air added with the chlorine must be sufficient to suspend the subdivided solids but not in excess to force the solids out of the reaction zone. Satisfactory suspensions have been obtained with ore or concentrates whose particle sizes fall within the size range of an average ilmenite beach sand which may be of the order of 40–120 mesh.

The air used in conjunction with the chlorine in the chlorination of the iron values should contain some moisture. It has been found that the moisture content may vary considerably, i. e. from a small amount of moisture in the air up to saturated air, provided the moisture content is at least 0.0004 pound of water per cubic foot of air used.

Apparently the chlorination of the iron values is substantially an instantaneous reaction and the ferric chloride formed is volatilized from the suspended bed. The ferric chloride while vaporized is decomposed by the introduction of oxygen to form iron oxide and to release chlorine gas from the reaction. The oxygen may be introduced as air but it has been found that the reaction proceeds more efficiently and rapidly if oxygen is added in a more concentrated form than is present in air, such as for example air fortified with additional oxygen or undiluted oxygen gas. The iron oxide formed by the above reaction is finely divided and is carried along with the released chlorine gas, carbon dioxide and nitrogen gases emitted from the iron chlorination step. The iron oxide is then removed from the gases by any convenient means such as a dust collector or an electrical precipitator.

The raw material remaining from the iron chlorination operation and containing the titanium values is separated preferably by transferring the material to separate zone. Herein the material is suspended in the presence of carbon and the titanium values are chlorinated with the released chlorine obtained from the oxidation of ferric chloride and any additional chlorine which may be added if required. Again the amount of chlorine necessary to obtain an efficient and economical operation is substantially the amount required to theoretically react with the titanium values to obtain titanium tetrachloride. The chlorination of the titanium values is carried out under conditions similar to those used from the chlorination of the iron values. If desired the gases carried along with the released chlorine may be introduced along with the chlorine to maintain the suspension during the chlorination of the titanium values.

Iron oxide and titanium tetrachloride may be efficiently and economically produced by the use of the above described unitary and integrated process of this invention.

The following examples are presented to explain more fully the details of a preferred embodiment of this invention.

*Example I*

Unground beach sand ilmenite ore containing 58.8% titanium dioxide, 9.8% ferrous oxide and 25.5% ferric oxide having a particle size range from 50 to 120 mesh was added to the bottom portion of a chamber at the rate of 10.0 parts per minute along with 1.0 part per minute of carbonized anthracite (parts expressed by weight). The material was added to a two foot suspended bed of the same mxiture in the chamber which was maintained in a fluidized state by passing 4.7 parts per minute of chlorine and 3.3 parts per minute of air, containing 0.00089 pound of water per cubic foot, in an upward gas flow through the suspension. The temperature of the bed was maintained at 850° C. The chlorine used was equal to the quantity which theoretically would react with the iron values in the ore. The conversion of the iron values in the ore to ferric chloride was 90%. Apparently, the chlorination of the iron values was substantially instantaneous and the substantially pure ferric chloride (free from titanium chloride) formed was volatilized from the suspended bed. The titanium concentrate was removed continually from the top portion of the bed by an overflow pipe positioned at the top of the suspension into another chamber at the rate of 6.8 parts per minute.

Directly above the suspension and in close proximity thereto, 1.0 part per minute of oxygen, which is equivalent to the theoretical amount, were introduced to oxidize the ferric chloride in the vapor state to produce iron oxide and chlorine. The conversion of the ferric chloride to iron oxide was 90%. The suspended iron oxide particles were removed from the gases by an electrical precipitator. The gases removed contained 3.9 parts of chlorine, 2.3 parts of carbon dioxide, 0.3 part hydrochloric acid gas and 2.3 parts of nitrogen.

The gases obtained from the oxidation step and containing the so-produced chlorine were added to the bottom portion of the second chamber containing the titanium concentrate at a rate of 8.5 parts per minute along with 7.1 parts per minute of additional chlorine to maintain the titanium concentrate in a fluidized state, and to chlorinate the titanium values to produce titanium tetrachloride. Carbonized anthracite was also added at the rate of 1.4 parts per minute. The total amount of chlorine added was equivalent to the theoretical amount necessary to react with the titanium values and the remainder of the iron values plus a 5% excess to compensate for the fixed chloride losses. The temperature of the suspended titanium concentrate was 850° C. The over-all chlorine efficiency was 95.4% with 98% of the titanium values converted to titanium tetrachloride. Substantially all of the iron values were converted to ferric chloride and 90% of the ferric chloride formed was converted to iron oxide. The exit gases from the second chamber contained 4.8 parts carbon dioxide, 0.4 part carbon monoxide, 0.8 part hydrochloric acid gas, and 2.6 parts nitrogen, which were removed from the system. The residue from the second chamber contained 14.5% of the total weight of the original ore, and contained 8.3% titanium dioxide and 0.6% iron.

*Example II*

An ilmenite ore containing 39.2% titanium dioxide and 41% iron present in the ore as iron oxide was ground to fall within the same particle size range as beach said ilmenite. The same procedure was used in this sample as was described in Example I, except 8.4 parts per minute of chlorine and 5.6 parts per minute of air, containing 0.0011 pound of water per cubic foot, were added with every 10 parts of ore and 1 part of carbonized anthracite. 96.5% of the iron values in the ore were converted to ferric chloride. Ferric chloride was treated in the vapor state with oxygen in the same manner as described in Example I except that 1.7 parts per minute of oxygen (theoretical amount) were added to the vaporized ferric chloride to oxidize the ferric chloride to iron oxide. 92% of the iron chloride values were converted to iron oxide. The chlorine produced from the ferric chloride oxidation step was sufficient to oxidize the titanium concentrate values. No additional chlorine was added to suspend the bed and to chlorinate the titanium values. The over-all chlorine efficiency was 96% with 94.5% of the titanium values converted to titanium tetrachloride. Substantially all of the iron values were converted to ferric chloride and 92% of the ferric chloride was converted to iron oxide. The residue from the second chamber consisted of 17.5% of the total weight of the original ore and contained 12.9% titanium dioxide and 2.3% iron.

From the data presented in the above examples it has been shown that at least 90% of the iron values in an ilmenite ore or concentrate may be converted to iron chloride without chlorinating any of the titanium values to titanium chloride. Oxidizing the ferric chloride in the vapor phase above the bed produces released chlorine which is utilized in the second step of the operation for chlorinating the titanium concentrate to produce titanium tetrachloride. By employing the process of this invention, high yields of iron oxide and titanium tetrachloride have been obtained from a titanium iron containing raw material.

In order to clearly show the advantages and effects of this invention, it may be compared with a process in which the gases obtained from the oxidation of the ferric chloride operation were recirculated to chlorinate more original ore instead of being used to chlorinate the titanium concentrate as carried out by the process of the present invention. It was found, however, that by this procedure the chlorination of the iron in the original raw material cannot exceed 70% conversion of the iron values in the ore to ferric chloride without the formation and contamination of titanium tetrachloride. In addition the titanium tetrachloride in turn is oxidized along with the ferric chloride to form titanium dioxide in a nonrecoverable form, i. e. intimately mixed with the finely divided iron oxide product. If the chlorination of the iron values is continued beyond 70% conversion in such a process, the formation of titanium tetrachloride becomes rapid. It has been found that as much as 20% to 30% of the titanium values present in the raw material will convert to titanium tetrachloride in such a process if the chlorination of the iron values is carried out to 90% conversion. With this type of process the conversions and yields must be kept low to prevent contamination of the products obtained.

By use of the unitary and integrated process of the present invention, however, at least 90% conversion of the iron values to ferric chloride may be obtained with substantially no contamination of the titanium values being present in the ferric chloride vapors or the subsequent iron oxide product.

By employment of the unitary and integrated process of this invention, iron oxide and titanium chloride may be prepared from titanium ores or concentrates in an efficient, convenient manner, and at less cost than the heretofore known processes. With the direct oxidation of the ferric chloride directly above the bed, while the ferric chloride remains in a vapor phase, sufficient utilization of the reagents by direct process with a minimum of handling of intermediate products have been attained. Also high yields of the iron oxide and titanium tetrachloride are obtained by this process without contamination of the products and without the inherent nonrecoverable losses exhibited by other processes.

While this invention has been described and illustrated by the examples shown, it is not intended to be strictly limited thereto and other modifications and variations may be employed within the limits of the following claims.

We claim:

1. Cyclical process for producing titanium tetrachloride and iron oxide from a titaniferous iron-containing raw material which comprises adding subdivided raw material and carbon to a chamber, introducing chlorine and moist air into said chamber to produce at elevated temperatures volatile ferric chloride substantially free from titanium tetrachloride and a titanium concentrate, said chlorine added in amount equal to substantially the theoretical amount to react with the iron values but not the titanium values, said moist air containing at least 0.0004 lb. of water per cubic foot of air used, separating said titanium concentrate from said volatilized ferric chloride and reacting substantially immediately, the separated volatilized ferric chloride with oxygen to produce ferric oxide and chlorine gas, separating said ferric oxide from the chlorine so produced and returning the chlorine so produced to react with the titanium values in the titanium concentrate to produce titanium tetrachloride, and collecting said titanium tetrachloride.

2. Process according to claim 1 in which said reactions are carried out in the fluidized state.

3. Process according to claim 1 wherein the chlorine and moist air are introduced upwardly through said mixture of raw material and carbon to maintain said mixture in a fluidized suspension and wherein said titanium concentrate is separated from said volatilized chloride by transferring the concentrate to a second chamber and wherein the recycled chlorine is introduced upwardly through the titanium concentrate in said second chamber to maintain said concentrate in a fluidized suspension while converting the titanium values to titanium tetrachloride.

LANCELOT W. ROWE.
ROLLIN P. SMITH.

References Cited in the file of this patent

UNITED STATES PATENTS

| Number | Name | Date |
|---|---|---|
| 1,845,342 | Saklatwalla | Feb. 16, 1932 |
| 1,979,280 | Mitchell | Nov. 6, 1934 |
| 2,020,431 | Osborne et al. | Nov. 12, 1935 |
| 2,184,884 | Muskat et al. | Dec. 26, 1939 |
| 2,245,076 | Muskat et al. | June 10, 1941 |
| 2,245,077 | Muskat et al. | June 10, 1941 |
| 2,486,912 | Belchetz | Nov. 1, 1949 |

FOREIGN PATENTS

| Number | Country | Date |
|---|---|---|
| 521,975 | Great Britain | June 5, 1940 |

OTHER REFERENCES

McPherson & Henderson's "General Chemistry," pp. 163, 164. Third ed., Ginn & Co., N. Y.